(12) United States Patent
Enniss

(10) Patent No.: US 9,044,918 B2
(45) Date of Patent: Jun. 2, 2015

(54) MODIFIED RELEASE COATINGS FOR OPTICALLY CLEAR FILM

(71) Applicant: CPFilms Inc., Fieldale, VA (US)

(72) Inventor: James P. Enniss, Martinsville, VA (US)

(73) Assignee: CPFilms Inc., Fieldale, VA (US)

( * ) Notice: Subject to any disclaimer, the term of this patent is extended or adjusted under 35 U.S.C. 154(b) by 125 days.

(21) Appl. No.: 13/707,346

(22) Filed: Dec. 6, 2012

(65) Prior Publication Data

US 2013/0149497 A1 Jun. 13, 2013

Related U.S. Application Data

(60) Provisional application No. 61/568,945, filed on Dec. 9, 2011.

(51) Int. Cl.
| | | |
|---|---|---|
| B32B 3/00 | (2006.01) |
| D06N 7/04 | (2006.01) |
| B32B 19/02 | (2006.01) |
| C09D 183/04 | (2006.01) |
| C09J 7/02 | (2006.01) |

(52) U.S. Cl.
CPC ........... *B32B 19/02* (2013.01); *Y10T 428/2443* (2015.01); *C09D 183/04* (2013.01); *C09J 7/0228* (2013.01); *C09J 2467/006* (2013.01); *C09J 2483/005* (2013.01)

(58) Field of Classification Search
None
See application file for complete search history.

(56) References Cited

U.S. PATENT DOCUMENTS

| | | | |
|---|---|---|---|
| 4,057,596 A * | 11/1977 | Takamizawa et al. | ........ 525/475 |
| 4,535,123 A | 8/1985 | Sasaki et al. | |
| 5,733,698 A | 3/1998 | Lehman et al. | |
| 2001/0033913 A1 * | 10/2001 | Murata et al. | ................. 428/143 |
| 2004/0062913 A1 | 4/2004 | Suto et al. | |
| 2005/0136208 A1 | 6/2005 | Iwata et al. | |
| 2006/0210768 A1 * | 9/2006 | Masuda | ........................ 428/141 |
| 2007/0197678 A1 | 8/2007 | Cavaleiro et al. | |
| 2008/0193696 A1 | 8/2008 | Hayes | |

FOREIGN PATENT DOCUMENTS

| | | |
|---|---|---|
| EP | 1 459 886 A1 | 9/2004 |
| WO | WO 2010/016651 A1 | 2/2010 |

OTHER PUBLICATIONS

Notification of Transmittal of the International Search Report and the Written Opinion of the International Searching Authority mailed Mar. 28, 2013 for International Application No. PCT/US2012/068269.
European Search Report dated Mar. 5, 2015 for Application No. 12856448.1-1303 / 2788189 PCT/US2012068269.

* cited by examiner

*Primary Examiner* — David Sample
*Assistant Examiner* — Nicole T Gugliotta
(74) *Attorney, Agent, or Firm* — John P. Foryt

(57) ABSTRACT

A modified silicone release coating suitable for use with clear, polymer films that shows reduced adherence when the resultant liner is wound up into large rolls and the smooth soft surfaces are placed into contact with each other. The adherence is reduced by providing a release layer which has a sub micro-rough top surface produced through the inclusion of a relatively small number of relatively large particles.

16 Claims, 1 Drawing Sheet

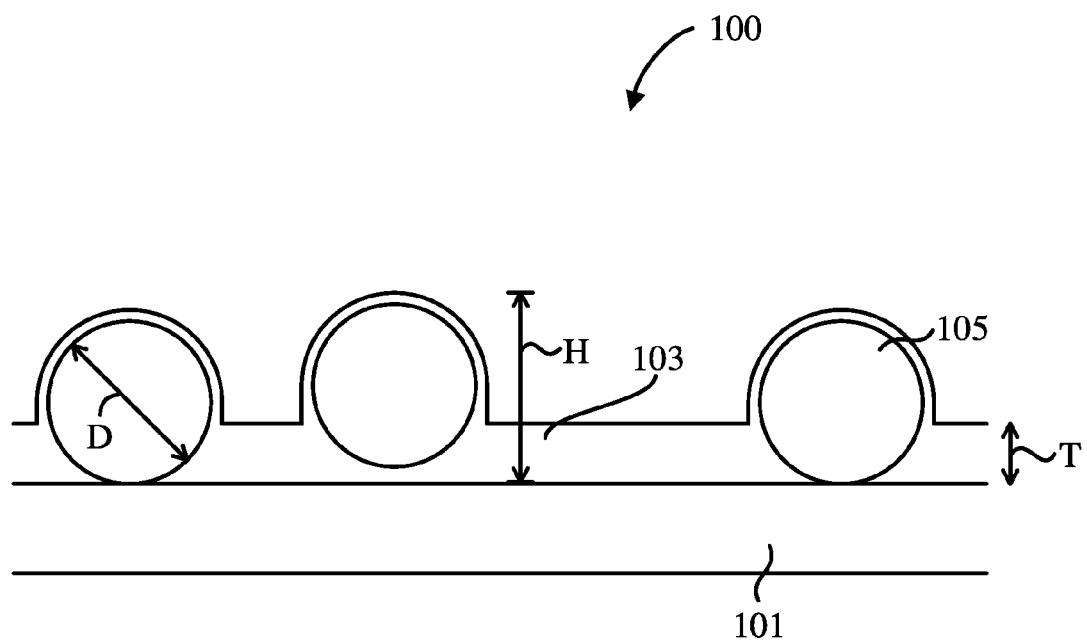

MODIFIED RELEASE COATINGS FOR OPTICALLY CLEAR FILM

CROSS REFERENCE TO RELATED APPLICATION(S)

This Application claims the benefit of U.S. Provisional Patent Application Ser. No. 61/568,945, filed Dec. 9, 2011, the entire disclosure of which is incorporated herein by reference.

BACKGROUND OF THE INVENTION

1. Field of the Invention

This disclosure is related to the field of release coatings which provide anti-adherence characteristics to rolled liners without introduction of problematic amounts of haze in later lamination.

2. Description of Related Art

Release coatings are generally used to prevent things from sticking together. This simple statement and function encompasses a broad base of technology and a large global industry involving both silicone and non-silicone materials. A very common release coating in the industry utilizes thermal curing based generally on the following reaction:

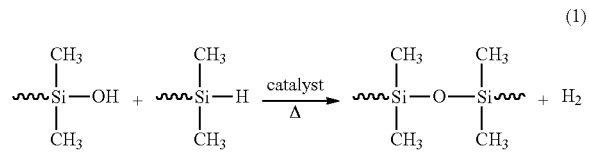

In the above reaction, a high molecular weight silanol prepolymer (such as α,ω-dihydroxysilanol of polydimethylsiloxane (PDMS) structure which has a molecular weight of about 5 kg/mol) reacts with a lower molecular weight silane (such as one with a molecular weight of about 2 kg/mol). The high functionality of the silane provides for the crosslinking of the silanol and the resultant curing of the coating through the formation of an infinite 3D polymeric network. The reaction proceeds slowly at room temperature, but dramatically accelerates in the presence of a catalyst and under elevated temperatures. The reaction is dehydrogenative condensation which is accompanied by evolution of dihydrogen.

Silicone release coated films are commonly used as liners in order to protect adhesive layers that are applied to other films or materials (called substrates in this disclosure). In a common embodiment, the liner will comprise a polyethylene terephthalate (PET) film which is then coated with a silicone release agent to form a liner. This liner will be manufactured for later use where the silicone release agent is coated with an adhesive, which adhesive is applied to a substrate and laminated to attach the adhesive to the substrate. Alternatively, a substrate may be coated with an adhesive, which is dried or cured, and then a silicone coated release liner is laminated to the adhesive. In either case, the liner often remains in place for a period of time after lamination to protect the adhesive. During the period where the liner is attached, it is commonly necessary that the combined material (substrate and liner) be generally optically clear and show little optical distortion. This is especially true if it is to be used for later films which are to be used in applications which require very high optical clarity such as touchscreens.

In the manufacturing of such a liner, the liner is generally manufactured in long sheets which are then rolled up to provide for easier shipping and storage. Specifically, a long roll of the film is provided which is unrolled, coated with the release agent during the unrolling, and rerolled to form a liner roll. The problem is that after the liner is rolled, if it sits for a period of time, the adjacent layers will often stick together between successive rolls. The adhesion (sticking together of the silicone release coating to the backside of the adjacent film) can be caused from a number of features, but is generally believed to occur more often when both the film and the release agent surfaces are very smooth and generally occurs more in larger rolls where there is more tension on the wound film. While the specific mechanism of attachment is not totally understood, it is believed that when very smooth surfaces are placed in contact, they tend to adhere due to sufficient surface contact allowing Van Der Waals forces to have macroscopic effect. This is similar to the effect generated by placing a small amount of water between two panes of glass.

Films with reduced smoothness generally don't stick together and therefore one methodology to eliminate the sticking problem is simply to make one or both of the surfaces rough. While this can work in some embodiments, it often makes the resulting film appear hazy. If the film does not need to be optically clear, this is generally not a problem. However, for applications where the film needs to be optically clear it is not an acceptable solution.

The adhesion is problematic because it can result in a number of undesirable alterations to the liner structure. In the first instance, the release layer may adhere to the opposing side (back) of the film layer with greater force than the primary side (front) of the film layer. It, thus, can be removed from the front side during unrolling which can result in the liner having defects present during the adhesive lamination where the release layer has been removed. This can result in the liner not being correctly removable from the adhesive and can result in an undesirable final product.

A more major concern is that the adhesion can be such that the film is torn during unrolling and prior to the adhesive addition, rendering part of the liner roll unusable. In an extreme situation, the adhesion could become so bad that the roll cannot be unrolled at all, destroying the entire liner roll.

Adhesion is particularly a problem for smooth, clear polymer films, especially smooth, clear polymer films such as PET that are coated with a silicon release coating. These films and coatings are often designed to be very smooth to provide for low haze and the adhesion strength is enhanced through an increase in surface area and, thus, surface smoothness of the polymer film sheets. Accordingly, PET films coated with silicone release coatings when rolled for purposes of storage and transportation tend to have an increased affinity to bond to themselves as their quality (transparency) improves.

Generally, the commonly used anti-blocking agents (which are chemical layers) are unsatisfactory for use in these liners. Such anti-blocking agents are commonly applied to the initial film roll (prior to the film being coated with the release layer), but the act of applying the release layer generally results in them being removed or covered. Thus, the anti-blocking agent is often useless to prevent adhesion within the liner roll. Alternatively, chemicals can be mixed into the release layer, but these can produce adverse reactions. Further, the chemicals applied for anti-blocking can be incompatible with the release layer and therefore cannot be used in the liner roll as they can result in damage to the release layer, an increase in haze (a loss of clarity and a reduction of specular reflectance) or other undesirable properties.

SUMMARY

Because of these and other problems in the art described herein is a modified silicone release coating suitable for use with clear, polymer films that shows reduced adherence when the resultant liner is wound up into large rolls and the smooth soft surfaces are placed into contact with each other. The adherence is reduced by providing a release layer which has a sub micro-rough top surface that inhibits the adhesion of the release layer to the backside of the film. This sub micro-rough surface is produced through the inclusion of a relatively small number of relatively large particles. These serve to produce a surface which is still extremely smooth over the vast majority of its area, while simultaneously having what amounts to large protrusions in that area.

Described herein, among other things, is a release liner comprising: a film; a silicone release coating layer distributed across said film in a first thickness; and a plurality of silica particles distributed across and embedded in said silicone release coating layer; wherein said silica particles have a diameter greater than said first thickness.

In an embodiment of the liner the diameter of said silica particles is at least 5 times said first thickness.

In an embodiment of the liner the film is polyethylene terephthalate.

In embodiments of the liner the first thickness is between about 50 nm and about 200 nm, between about 70 nm and about 100 nm or about 100 nm.

In an embodiment of the liner the diameter of said particles is about 500 nm.

In an embodiment of the liner the liner has a haze value of 2 or less, 1.5 or less, 1 or less, or 0.5 of less.

In an embodiment of the liner the particles comprise about 1.5% or less, or about 0.5 to about 1.5%, by weight, of said silicone release coating layer after the silicone release liner has cured. This includes a liner having a haze of 2 or less where the particles comprise about 0.68% by weight and a liner having a haze of about 0.5 where the particles comprise about 1.34% by weight.

There is also described herein a method of forming a silicone release coating comprising: forming a premixture comprising silica particles having a diameter and a solvent; mixing said premixture, additional solvent, a silanol, a silane, and a catalyst to form a release coating mixture; and thermally curing said mixture to form a silicone release coating having a thickness; wherein said thickness of said silicone release coating is less than said diameter of said silica particles.

There is also described herein a low haze release liner comprising: a film; a silicone release coating layer distributed across said film in a thickness of about 100 nm or less; and a plurality of silica particles distributed across and embedded in said silicone release coating layer; wherein said silica particles have a diameter at least 5 times said thickness of said silicone release coating; and wherein said liner has a haze of 2 or less.

BRIEF DESCRIPTION OF THE DRAWINGS

FIG. 1 provides a cross sectional view of a liner formed from a film and release layer including small particles. FIG. 1 is an exaggerated view and is not to scale.

DETAILED DESCRIPTION OF PREFERRED EMBODIMENTS

Shown in FIG. 1 is an embodiment of a liner (100) which comprises a film (101), a release layer (103) and a filler formed of a series of small particles (105) which are embedded in the release layer (103). The film (101) will generally comprise a very smooth PET film but that is by no means required and other films can be used. The film (101) will generally be smooth enough to be considered optically clear. The release layer (103) will generally comprise a silicone release layer formed from silicone and various solvents and other materials known to those of ordinary skill but may comprise other chemical release agents formed into a release layer (103) as known to those of ordinary skill. Again, the release layer (103) will preferably be optically clear.

In combination the liner (100) will generally comprise very smooth exterior surfaces and will generally be optically clear. In standard haze measurements, this would be a haze of below 2, below 1.5, below 1.0, or below 0.5 depending on embodiment and as measured by ASTM D1003. Generally this would correspond to films where less than 2% of transmitted light deviates more than 2.5 degrees from the incident beam by forward scattering.

The filler (105) will generally comprise a collection of small particles which are embedded in and distributed across the layer (103). In an embodiment where the release layer (103) comprises a silicone release agent, the filler (105) may comprise silica particles. It is generally preferred that the filler small particles (105) be comprised of microspheres or other relatively rigid particles that are composed of materials having a similar refractive index to the release layer (103). In an embodiment, the small particles comprises silica microspheres such as, but not limited to, those available under the trademark of Tospearl™ and sold by Momentive Specialty Chemicals, Inc.

The small particles (105) will generally be blended into the release layer (103) such as, but not limited to, through the use of a high speed prop mixer prior to the release layer (103) being coated onto the film (101) and dried or cured. The small particles (105) may be provided for mixing in the form of a non-amalgamated dry powder, may be placed in a liquid suspension (e.g. a premix) in order to facilitate them being added to the release layer (103), or may otherwise be provided as part of an alternative premix in order to enhance even distribution throughout the release layer mixture prior to the release mixture being distributed on the film (101).

In the event that a liquid suspension is used to suspend the filler (105) prior to it being added to the release layer (103), it is generally preferred that the suspension liquid be a solvent or other material which is already in use in, or compatible with, the release layer (103) or be a material which can be readily removed (such as by evaporation) from the release layer (103) prior to the release layer (103) being coated on the film (101). In this way, no additional or undesirable chemicals are added to the release layer (103) through the introduction of the suspension and the chemical properties of the release layer (103) are not altered. One such embodiment is shown below in Example 1.

The small particles (105) will generally be provided in a size which corresponds to the resultant thickness of the release layer (103). Specifically, as should be apparent from FIG. 1, the particles (105) will be mixed into the release layer (103) and therefore may be coated with the release layer material and may have some of the release layer (103) overlapping them. In order to provide that the surface of the release layer (103) is sub micro-rough, it is desirable that the small particles (105) have a diameter (D) greater than the thickness (T) of the release layer (103) that is applied to the film (101), and generally significantly greater. Thus, the size of small particles (105) chosen will generally depend on the nature and thickness of the release layer (103).

In an embodiment, where a silicone release agent and silica microspheres are used, the release layer (103) will be coated on the film in a roll-to-roll coating method such as rotogravure (or simply "gravure" based on common art usage) printing process as is understood by those of ordinary skill in the art. The release layer (103) will generally have a relatively uniform thickness, however, it is recognized that variation can exist across the surface and therefore all thicknesses provided here are subject to some internal variations. Further, as the release layer (103) includes the particles (105) (which are indicated to be "thicker" than the release layer (103) in this discussion), it should be recognized that the thickness of the release layer (103) as that term used herein, refers to the thickness of the layer apart from the layer at the point where there is a particle (105) embedded in the layer. This is indicated by thickness (T) in FIG. 1.

It should also be recognized that the particles (105) generally do not extend from the release layer (103) in the direction of the film (101). That is, the surface of the release layer (103) adjacent the film (101) is generally smooth. As the layer (103) and particles are generally applied as a liquid mixture to the solid film, it should be apparent that the particles (105) will generally rest on or close to the film (101) and the release layer (103) will flow about the particles creating the general structure of FIG. 1.

It should be recognized that multiple thicknesses (T) of the release layer (103) and size of particles (105) can be used. Depending on the embodiment, the release layer (103) will generally range in thickness (T) from about 50 to about 200 nanometers (nm), more preferably from about 50 to about 150 nm, and more preferably about 50 to about 100 nm. The mean size (diameter) of the microspheres (105) will preferably range from about 200 to about 1000 nm, more preferably from about 500 to about 700 nm, and more preferably about 500 nm.

In the depicted embodiment, a silicone release layer (103) is applied in a thickness (T) of about 100 nm. In this case, silica microspheres which generally have a mean diameter (D) of about 500 nm are used as the small particles (105). This allows for the microspheres (105) to clearly stick up above the silicon release layer (103) even if they are not suspended on the release layer (103) but are in surface (direct) contact with the film (101). In an embodiment, this about 5 to 1 ratio of mean particle (105) diameter (D) to layer (103) thickness (T) is maintained across different thicknesses (T) of the release layer (103) and thus smaller particles (105) are used if the release layer (103) can be reliably made thinner and larger particles can be used in thicker release layers. However, in an embodiment, it can be difficult to reliably obtain and use particles much smaller than the about 500 nm diameter (D) size and particles of about 500 nm size can be used with layers of a thickness of about 70 nm and about 50 nm which results in a much larger ratio of mean particle (105) diameter (D) to layer (103) thickness (T). Layers thinner than 50 nm are currently extremely difficult to manufacture and, thus, it is expected that particles of the same size ratios will work with thinner layers (103), however, still further increased ratios are also expected to still be useable.

It should be recognized that generally a smaller microsphere (105) is preferred, so long as it still has sufficient diameter (D) to extend above the surface of the release agent layer (103) once the layer has been cured. Thus, in an embodiment, a 100 nm release layer (103) can include any particle (105) having a mean diameter of greater than 100 nm. However, there are often practical limitations on the sizes of particles (105) which can be used and the difference needs to be enough to create a sub micro-rough surface. Small particles (105) below the 500 nm size may have to be used which are stored in suspension in order to avoid agglomeration and many of the suspension liquids that are commonly used with silica particles are incompatible with silicone release agents.

Thus, generally 500 nm small particles (105) will often be used for a relatively large number of different release layer (103) thicknesses (T) to avoid potential practical problems of mixing in smaller particles. Alternatively, smaller particles may require alternative mixing techniques in order to eliminate any suspension liquid in which the particles were stored prior to mixing.

It should also be recognized that the distance (H) (the height of the "peaks" of the particles (105) in the layer (103)) are not necessarily equal to the diameter (D) of the particles although they will generally be very close. Specifically, as is visible in FIG. 1, in some cases the particles (105) can have a thin coating of the material of the layer (103) on their outer surface which means they may not rest directly on the film (101), and/or they may have a thin layer of the layer (103) material on their upper surface. Either or both of these effects can slightly increase the peak height (H) compared to the film (101) and if such phenomena are sufficiently large (e.g. if the layer (103) is sufficiently viscous), smaller particles (105) can be used to provide the same peak height (H) as larger particles may provide in other layers (103). In an embodiment, this peak height (H) is also an about 5, or more, to 1 ratio to the thickness (T) of the release layer (103).

One concern in the use of small particle (105) additions to the release layer (103) to prevent adhesion relates to the potential introduction of haze when the release layer (103) is applied to an adhesive and laminated to a substrate (or the adhesive is applied to the release layer (103)). In many applications, it is necessary that after the liner (100) has been laminated to a substrate, light be able to pass through the combined material without significant distortion. This distortion is generally called haze as is discussed above.

In order to reduce the amount of haze, it is firstly generally preferred, as discussed above, that the small particles (105) be selected so as to have a refractive index similar to the refractive index of the release layer (103). In this way, it is generally less likely that the particles will introduce haze due to internal reflection or other scattering of incident light between release layer (103) and small particles (105). Thus silicone-based release layers will commonly be used with silica particles. Hydrocarbon or wax based release agents would preferably use polyolefin nanoparticles to achieve the same effect. However, different materials can still be used in conjunction with each other depending on haze requirements and depending on the refractive indices of the individual materials used.

The haze is also generally reduced by keeping the amount of particles (105) at a relatively low percentage of total weight, and in keeping the release layer (103) relatively thin to both reduce haze from its thickness, and to reduce the total number of small particles (105) present in the liner (100). Thus, it may be desirable to use fewer larger particles (or fewer particles of different chemical makeup) compared to a greater number of smaller or (chemically similar) particles. In an embodiment of a film having a haze of 2 or less, the particles are provided in a weight ratio of about 0.01 to about 1%, more preferably about 0.25 to about 0.75%, and even more preferably about 0.65% to 0.68% to the weight of the dried/cured release coating. For films which are very smooth, with a haze of 1 or less, a greater percentage from about 0.01% to about 1.5%, is preferred. More preferably a range of about 0.5% to about 1.5% and more preferably from about 1% to about 1.5% is used. The amount used will always be an amount effective to reduce or prevent adhesion of the rolled films and, thus, while these ranges provide useful guidelines, other percentages may be used depending on specific materials and the ordinary skill of those in the art.

The smaller percentage of larger particles can be particularly beneficial to reduce potential haze as in any given section of the liner (100), there may only be a single particle (105) (or even none) present. Thus, the introduction of haze by this particle is not only quite slight, but effects very little of the layer (100) area. Specifically, the amount of effect caused by a single particle, while it may be locally significant, may be insignificant on the macro scale of a resultant liner film piece. In effect, the liner (100) becomes like the surface of a smooth pond with a number of very large rocks in it. While the rock may be visible if one looks directly at it, if one looks over the water, the rock may not be visible at all as it is outside the field of view. Similarly, if one is to look at the pond in a macro-scale view (e.g. from great elevation), the rocks will often be lost in the pond surface as they are relatively so small (and so scattered). This same effect can be used to provide for optical clarity to the resultant liner (100) because the distortion caused by any particular particle, while relatively large at the particle, is small in the macro scale as the particle itself is quite small compared to the amount of film liner being observed, and the distortion is locally isolated.

Using a release coating formulation comprising silica microspheres (105) having a mean diameter of about 500 nm where the ratio by weight of silicon microspheres to silicone release layer (103) was about 0.68%, it was also found that a general reduction in the amount of release layer (103) applied resulted in both a thinner release layer (103), and a general reduction in haze regardless of the type of film used. Further, the anti-adhesion capability was generally also improved or unaffected (remained the same and did not worsen). Thus, use of less release layer (103) material (and thus fewer particles (105)) is generally preferred so long as the release layer (103) is sufficiently thick to allow for release of the adhesive it is to be used with after lamination.

It has been found that for silica microspheres (105) used as a release particles, generally haze increases as the amount (ppm) of silica particles (105) used increases. Thus, there appears to be an inverse relationship between increased surface roughness and the optical performance of the liner (100). This allows for selection by a skilled practitioner of an amount of silica microspheres (105) and silicone release layer (103) thickness (T) that provides the desired release agent properties, anti-adhesion properties, and resultant low haze characteristics. Specifically, if optical clarity is not required, a greater percentage of particles may be used, while if a much higher standard of optical clarity is required (i.e. lower haze) and some sticking is acceptable, a much smaller percentage may be used.

While the above contemplates that a variety of different percentages may be used, the following example illustrates a specific liner (100) including particles (105) which can maintain a very high optical clarity (a haze of less than 2), while showing substantial improvement in separation.

Example 1

A silicone release liner including distributed and embedded microsphere particles was manufactured. The first step was forming a particle premix in a high speed mixer. The premix of microsphere particles was made by blending silicone resin and solvent in the ratios of Table 1. This provided for suspension of the particles in a liquid solvent to improve particle distribution in the silicone release layer mixture.

TABLE 1

| Premix Component | Weight Measurement |
|---|---|
| Solvent (Toluene) | 18 |
| Silicone Resin (SS4191A) | 1 |
| Particles (Tospearl ™ 105) | 1 |

The premix was then blended into a release coating mixture using techniques known by one of ordinary skill in the art in the amounts (by weight) shown in Table 2 below. This resulted in a ratio of microsphere particles to resultant release layer of about 0.68% by weight. All the materials referred to by reference number, name, or trademark are products of Momentive Specialty Chemicals, Inc.

TABLE 2

| Release Liner Component | Weight Measurement |
|---|---|
| Solvent (Toluene) | 55 |
| Solvent (Heptane) | 95 |
| Silicone Resin - Silanol (SS4191A) | 34.5 |
| Crosslinker - Silane (SS4191B) | 0.56 |
| Catalyst (Tin-based) (SS4192C) | 1.38 |
| Amine Stabilizer (SS4259C) | 1.38 |
| Particle Premix | 0.9384 |

Once the release coating formulation was made, it was applied using roll to roll coating methods to a PET substrate film in thicknesses of about 80 to about 100 nm. Roll to roll coating of the substrate film was accomplished by the gravure roll coating method. The silicone release coating was dried and cured in a hot air oven for a recommended time as specified by the material supplier. Resultant films were determined to have improved slip and did not stick when tested as discussed below.

This release coating formulation proved suitable for liners where a resultant haze of less than 2 was desired. For a film with a very low haze, such as a haze of 0.5 or less, a higher level of particles was necessary. Specifically in the formulation of Table 2 a weight of 1.8492 of particle premix was used to get a 1.34% particle ratio. Slip between the coating and the smooth uncoated backside of a film with very low haze (about 0.5) continued to improve as the particle level was increased up to 1.34% (by weight) microsphere particles. At this particle level the coated film (layer) haze increased to about 0.9 (from about 0.5) which is still considered very low haze (very clear) but was a substantial increase in the haze level over the underlying film substrate prior to coating.

The "slip" discussed above between the silicon coated release film and the backside of a film (the uncoated side) is determined by placing a very clean piece of film (one that has not been allowed to collect dust), on a smooth flat surface such as plate glass with the uncoated side up. Then a test film having a silicone release coating with microspheres is placed onto the first film so that the silicone coating contacts the first film. The air is pressed out from between the films using, for example, a thumb as one would squeegee water off a surface. Then, while holding the edge of the first film still (or taping it down), an attempt is made to slide the silicone release coated film (test film) across the uncoated backside of the first film by pulling on the edge of the test film. Films with insufficient particles will stick and not allow the top silicone coated film to slide along the first film surface. Sliding the release coated film on the uncoated film is a measure of friction forces. If the surfaces stick, the force to make the films slide is very high, but if the films do not stick, very little force is required to slide the silicone release coated film across the first uncoated film. Thus, films with relatively low (easy) slip (by hand) would generally not be expected to stick when rolled into larger rolls.

While the inventions have been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of any invention herein disclosed.

It will further be understood that any of the ranges, values, or characteristics given for any single component of the present disclosure can be used interchangeably with any ranges, values or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. release liner comprising:
   a film;
   a silicone release coating layer distributed across said film in a first thickness; and
   a plurality of silica particles distributed across and embedded in said silicone release coating layer;
   wherein said silica particles have a diameter greater than said first thickness and
   wherein said liner has a haze value of 2 or less.

2. The liner of claim 1 wherein said diameter of said silica particles is at least 5 times said first thickness.

3. The liner of claim 1 wherein said film is polyethylene terephthalate.

4. A release liner comprising:
   a film;
   a silicone release coating layer distributed across said film in a first thickness; and
   a plurality of silica particles distributed across and embedded in said silicone release coating layer;
   wherein said silica particles have a diameter greater than said first thickness and said first thickness is between about 50 nm and about 200 nm.

5. The liner of claim 4 wherein said first thickness is between about 70 nm and about 100 nm.

6. The liner of claim 4 wherein said first thickness is about 100 nm.

7. The liner of claim 1 wherein said diameter of said particles is about 500 nm.

8. The liner of claim 1 wherein said liner has a haze value of 1.5 or less.

9. The liner of claim 1 wherein said liner has a haze value of 1 or less.

10. The liner of claim 1 wherein said liner has a haze value of about 0.5.

11. The liner of claim 1 wherein said particles comprise about 1.5% or less, by weight, of said silicone release coating layer after said silicone release coating layer has cured.

12. The liner of claim 11 wherein said particles comprise between about 0.5% to about 1.5% by weight, of said silicone release coating layer after said silicone release coating layer has cured.

13. The liner of claim 12 wherein said particles comprise about 0.68% by weight, of said silicone release coating layer after said silicone release coating layer has cured.

14. The liner of claim 11 wherein said liner has a haze of about 0.5.

15. The liner of claim 14 wherein said particles comprise about 1.34% by weight, of said silicone release coating layer after said silicone release coating layer has cured.

16. A low haze release liner comprising:
    a film;
    a silicone release coating layer distributed across said film in a thickness of about 100 nm or less; and
    a plurality of silica particles distributed across and embedded in said silicone release coating layer;
    wherein said silica particles have a diameter at least 5 times said thickness of said silicone release coating; and
    wherein said liner has a haze of 2 or less.

* * * * *